United States Patent Office 2,925,449
Patented Feb. 16, 1960

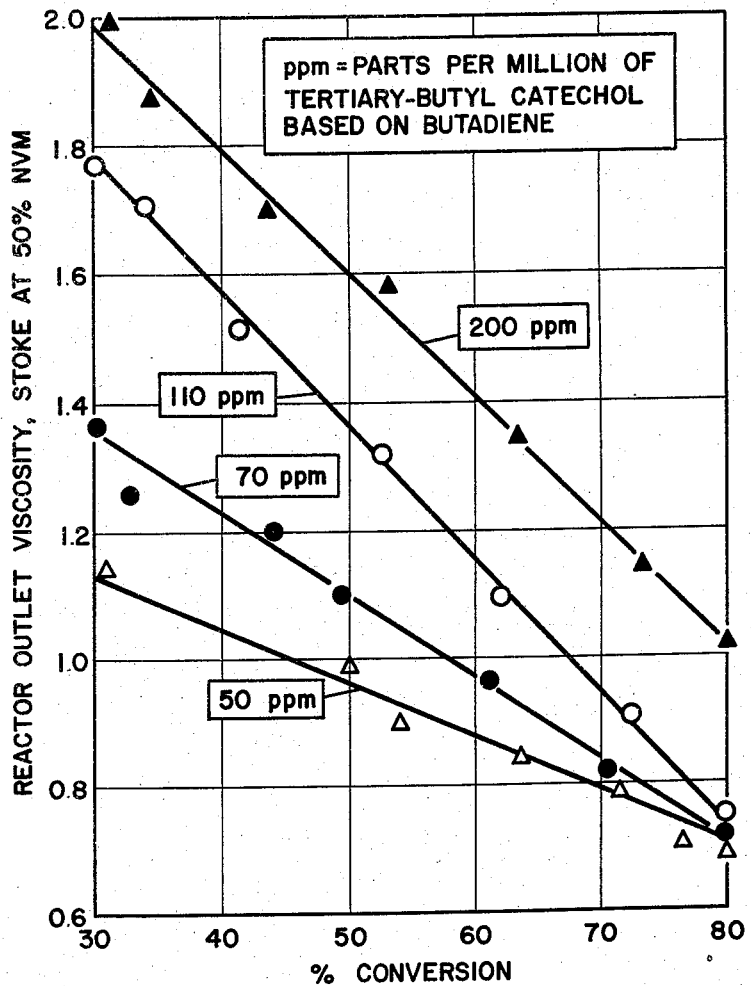

2,925,449

INCREASING VISCOSITY OF COPOLYMERS

Peter Joseph Berkeley, Jr., Baton Rouge, La., assignor to Esso Research and Engineering Company, a corporation of Delaware Application May 7, 1958, Serial No. 733,769

6 Claims. (Cl. 260—669)

This invention relates to producing high molecular weight polymers. More particularly, the present invention relates to producing high molecular weight polymers of butadiene with or without, as a comonomer, styrene, by the addition to the reactor feed of certain polyhydroxy benzenes.

The invention is particularly adapted to a process for the preparation of high molecular weight drying oils by the copolymerization of about 75 to 100 parts of butadiene with about 25 to 0 parts of styrene, preferably about 75 to 85 parts of the former and about 25 to 15 parts of the latter by use of an alkali metal catalyst.

It has now been discovered that such homopolymer or copolymer oils may be remarkably increased in molecular weight and thus viscosity by the addition to the reactor feed of about 30 to 500 p.p.m. and preferably about 50 to 300 p.p.m. based on butadiene of at least one dihydroxy aromatic compound such as dihydroxy benzenes.

Suitable dihydroxy benzenes falling within the purview of the present invention include, among others, hydroquinone, 1,2-dihydroxy benzene, 1,3-dihydroxy benzene, dihydroxy naphthalenes, alkylated dihydroxy naphthalenes, 1,2-dihydroxy-3-methyl benzene, 1,4-dihydroxy-2-isobutyl benzene, and especially tertiary butyl catechol.

The invention will be best understood from the following description when read in connection with the accompanying drawing in which the single figure is a graph or chart demonstrating the higher viscosity or molecular weight of the products produced in accordance with the present invention.

In practicing the present invention the monomer or monomers are mixed with a suitable reaction diluent such as naphtha and also with the above-mentioned amounts of dihydroxy benzene compounds and polymerization continuously effected at 20° to 100° C., preferably between about 40° and 90° C. in the presence of an alkali catalyst metal such as potassium and/or lithium and/or especially sodium to produce the desired high molecular weight polymer.

The amount of polymerization catalyst is generally between about 1.5 and 10 parts, preferably about 1.5 to 3 parts of the finely divided alkali metal per 100 parts of comonomers. The catalyst, preferably sodium, should have a fineness or particle size of less than about 100 microns and preferably below about 50 microns (e.g., about 1–40 microns). The catalyst is used in the optional presence of various polymerization modifiers which tend to promote the reaction and produce colorless products or more reproducible drying rates. As an inert reaction diluent, it is desirable to use, for example, a hydrocarbon or hydrocarbons boiling within the range of about 90 and 180° C. or especially a straight run mineral spirits fraction such as Varsol (boiling range 150–200° C.) or other inert hydrocarbon diluents boiling between 20° and 220° C. such as pentane, xylene, toluene, benzene, cyclohexane, or the like; individually or in admixture with each other.

The diluents are usually used in amounts of about from 50 to 500, preferably about 150 to 300 parts per 100 parts of monomers. Various ethers having more than two carbon atoms per molecule such as diethyl ether, acetal, dioxane, vinyl ethyl ether, vinyl isobutyl ether, t-butyl methyl ether and methylal, are also useful as diluents and are particularly helpful as co-diluents to insure formation of colorless products when used in amounts ranging from about 10 to 35 parts per 100 parts of monomers, together with the aforesaid amount of inert diluent such as solvent naphtha. Other means of modifying the polymer properties involve the substitution of all or part of the butadiene feed with other diolefins such as isoprene, piperylene, 2,3-dimethyl butadiene-1,3, or 2-methylpentadiene-1,3. Also, instead of styrene, various ring substituted alkyl styrenes such as p-methyl styrene or p-ethyl styrene or the dimethyl styrenes may be used.

Especially where a relatively coarse dispersion of sodium is used as catalyst, it is also advantageous to use about 1 to 50 weight percent, preferably 10 to 20 weight percent based on sodium of a $C_1$ to $C_5$ aliphatic alcohol. Secondary and tertiary alcohols, particularly isopropanol or tertiary butanols are preferred. Such alcohols act as polymerization promoters. Conversions of 50 to 100 percent on monomers are readily realized in batch as well as in continuous polymerization, although the catalyst requirements are greater for continuous than for batch operation.

In order to more fully illustrate the present invention reference is made to the accompanying chart graphically depicting the increasing slope of polymers containing increasing quantities of tertiary-butyl catechol. It is apparent from this drawing that significant improvements are obtained within the range of between about 30 and 500 p.p.m. and especially about 50 to 200 p.p.m. based on butadiene of added tertiary-butyl catechol to the reactor feed.

Resort may be had to modifications and variations of the disclosed embodiments without departing from the spirit of the invention or the scope of the appended claims.

What is claimed is:

1. In a process for the preparation of drying oils wherein about 75 to 100 parts of butadiene are copolymerized with about 25 to 0 parts of styrene at a temperature level of 20° to 100° C. in the presence of a finely divided alkali metal catalyst and an inert hydrocarbon diluent to form said drying oil, the improvement which comprises adding to the reactor feed about 30 to 500 parts per million of a dihydroxy aromatic compound base on reacting butadiene so that the molecular weight of the drying oil is increased.

2. A process according to claim 1 in which the amount of added dihydroxy aromatic compound is between about 50 and 200 p.p.m. based on reacting butadiene.

3. A process according to claim 1 in which the dihydroxy aromatic compound is a dihydroxy benzene.

4. A product produced by the process of claim 1.

5. A process according to claim 3 in which the dihydroxy benzene comprises tertiary-butyl catechol.

6. A process according to claim 3 in which the dihydroxy benzene compound comprises hydroquinone.

References Cited in the file of this patent

UNITED STATES PATENTS

| | | |
|---|---|---|
| 2,257,078 | Soday | Sept. 23, 1941 |
| 2,643,985 | Parker | June 30, 1953 |
| 2,753,385 | Gleason | July 3, 1956 |
| 2,767,229 | Gleason | Oct. 16, 1956 |
| 2,784,167 | Schneider et al. | Mar. 5, 1957 |

UNITED STATES PATENT OFFICE

CERTIFICATE OF CORRECTION

Patent No. 2,925,449                              February 16, 1960

Peter Joseph Berkeley, Jr.

It is hereby certified that error appears in the printed specification of the above numbered patent requiring correction and that the said Letters Patent should read as corrected below.

Column 2, line 51, for "base" read -- based --.

Signed and sealed this 30th day of August 1960.

(SEAL)
Attest:
ERNEST W. SWIDER
Attesting Officer

ROBERT C. WATSON
Commissioner of Patents